United States Patent [19]

Takahashi et al.

[11] 4,315,052
[45] Feb. 9, 1982

[54] MAGNETIC RECORDING MEDIUM

[75] Inventors: Noboru Takahashi; Sadao Ozaki; Hiromasa Isono; Toshikazu Nishihara; Takeshi Ikushima; Tunehide Naruse, all of Yokohama, Japan

[73] Assignee: Victor Company of Japan, Limited, Yokohama, Japan

[21] Appl. No.: 162,092

[22] Filed: Jun. 23, 1980

[30] Foreign Application Priority Data

Jun. 26, 1979 [JP] Japan .................................. 54-79749

[51] Int. Cl.³ ............................................. G11B 5/70
[52] U.S. Cl. .................................. 428/328; 360/134; 428/695; 428/900
[58] Field of Search .................... 252/62.54, 62.56; 427/128; 360/134, 131, 135, 136; 428/425.9, 539, 900, 328, 329

[56] References Cited

U.S. PATENT DOCUMENTS

| | | | |
|---|---|---|---|
| 3,387,993 | 6/1968 | Flowers | 428/900 |
| 3,843,404 | 10/1974 | Haefele et al. | 252/62.54 |
| 4,074,002 | 2/1978 | Hack et al. | 252/62.54 |
| 4,074,012 | 2/1978 | Heiklinen et al. | 252/62.54 |

FOREIGN PATENT DOCUMENTS

| | | | |
|---|---|---|---|
| 820931 | 4/1959 | United Kingdom | 252/62.5R |
| 1049628 | 11/1966 | United Kingdom | 427/128 |

*Primary Examiner*—Stanley S. Silverman
*Attorney, Agent, or Firm*—Lowe, King, Price & Becker

[57] ABSTRACT

A magnetic recording medium which comprises a support, and a magnetic recording layer formed on the support, the magnetic recording layer being comprised of a major proportion of a magnetic metal powder and minor proportions of a metal oxide powder, the metal oxide powder serving as a wear-resistant agent, an organic binder and ethylene stearyl bisamide serving as a lubricant.

4 Claims, 1 Drawing Figure

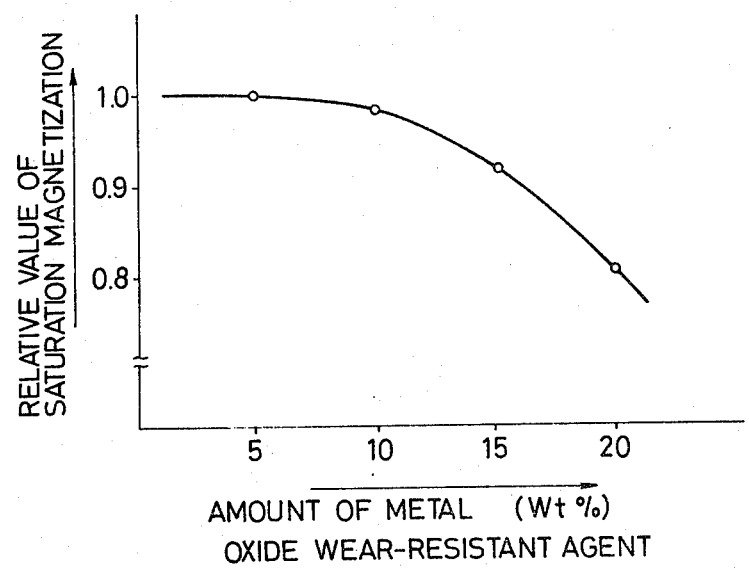

MAGNETIC RECORDING MEDIUM

BACKGROUND OF THE INVENTION

1. Field of the Invention

This invention relates to magnetic recording media suitable for high density recording in which magnetic metal powders are used together with a specific type of lubricant, and a method for making such media.

2. Description of the Prior Art

In the production of magnetic recording media, it is the general practice to use metal oxides such as $\gamma$-$Fe_2O_3$, $Fe_3O_4$ or $CrO_2$ as a magnetic powder for such media. However, magnetic recording media using these magnetic metal oxide powders have not been found suitable for high density recording since they are small in coercive force and magnetic flux density. Accordingly, instead of these magnetic oxide powders, magnetic powders of metals such as Fe or Fe-Co alloys with or without other metal components have been recently used to provide high density recording media. This is because the metal powder such as Fe powder is greater in coercive force and is more convenient for high density recording. However, mere use of magnetic metal or alloy powders instead of the oxide powders presented various problems. For instance, when such metal or alloy magnetic powders are used in combination with lubricants such as stearic acid amide ordinarily employed with magnetic oxide powders, the resultant magnetic recording media show rather poor runnability or travelling performance and are liable to cause friction noise (or so-called Q noise) on contact with recording and reproducing heads or guide members. In addition, magnetic metal powders usually have a greater intensity of magnetization of particles themselves than oxide magnetic powders and thus such particles are hard to be dispersed in magnetic paint. When magnetic metal particles are mechanically treated to improve their dispersability, they tend to be broken to pieces, leading to deterioration of magnetic characteristics.

Further, it has been found that metal magnetic particles are smaller in hardness than oxide magnetic particles and become smaller in film strength when used to make a magnetic recording layer together with a binder or other constituents and tend to suffer scratches or other abrasion or wear defects on the surface thereof on application of such magnetic recording media to recording and reproducing systems as compared with oxide magnetic particles which are harder and thus less susceptible to defects on their surface.

As will be apparent from the above, the use of metal or alloy magnetic powder instead of ordinarily employed oxide magnetic powders as a magnetic powder for magnetic recording media dictates use of specific types of other constituents necessary for such media, particularly a specific type of lubricant.

SUMMARY OF THE INVENTION

It is accordingly an object of the present invention to provide magnetic recording media which uses magnetic metal powders and ethylene stearyl bisamide as a lubricant.

It is another object of the present invention to provide magnetic recording media which have excellent film strength and runnability and are resistant to defects on the surface thereof on application to recorder and reproducing systems.

It is a further object of the present invention to provide magnetic recording media which do not cause any friction noise on contact with recording and reproducing heads and related members in practical applications.

It is a still further object of the present invention to provide magnetic recording media which are excellent in coercive force and saturated magnetic flux density and are thus suitable for high density recording.

The above objects can be achieved by a magnetic recording medium which comprises a support and a magnetic recording layer formed on the support and comprised of a magnetic metal powder, about 2 to 20 wt % of a wear resistant metal oxide, about 1.0 to 10 wt % of ethylene stearyl bisamide and about 10 to 25 wt % of an organic resin binder all based on the magnetic metal powder.

One of prominent features of the present invention is that the magnetic recording layer of the medium makes use of ethylene stearyl bisamide as a lubricant in combination with a magnetic metal powder.

EMBODIMENTS OF THE INVENTION

The magnetic metal powder useful in the present invention is powder of Fe or Fe-Co alloys, which are usually employed in an acicular form. Nickel, zinc or other metals may be incorporated in the alloys in small amounts as is well known in the art. In practice, the acicular powder is preferred to have a mean length of 0.3 to 0.6$\mu$.

When the magnetic metal powder is used in combination with known lubricants which are considered effective as a lubricant of magnetic recording media using magnetic oxide powders, e.g. monohydric alcohol esters for fatty acids such as stearic acid, fatty acid amides such as stearic acid amide, silicone oil, and other hydrocarbon oil, the resultant magnetic recording media have been found ineffective in preventing the Q noise from occurring on contact with a recording or reproducing head. To a surprise, it has been found that when ethylene stearyl bisamide is used as a lubricant in an amount of about 1 to 10 wt % of the magnetic metal powder, the friction noise or Q noise is effectively prevented. Ethylene stearyl bisamide is preferably used in an amount of about 1 to 5 wt % in view of a fact that not only the friction noise is suitably prevented, but also the bisamide is prevented from being bloomed from the magnetic layer.

Larger amounts are more effective in preventing the friction noise but give a considerable plasticizing effect on the organic resin binder, tending to cause wear defects on the surface of the magnetic recording layer of the medium. In order to prevent wear defects, it has been considered effective to add a wear-resistant agent in large amounts, however, it has been found also effective to use an organic binder having relatively high elasticity.

The resin binders to be used in the present invention include those which contain rubber-like materials and, for example, a mixture of a vinyl alcohol-containing vinyl chloride-vinyl acetate copolymer and a polyurethane elastomer, a mixture of vinyl alcohol-containing vinyl chloride-vinyl acetate copolymer, a polyurethane elastomer and a nitrile-butadiene rubber, and the like. The resin binder mixture is used in an amount of about 10 to 25 wt % of the magnetic metal powder. These binders serve, cooperatively with ethlene stearyl bisamide lubricant, not only to effectively prevent the defects from being produced on the layer surface, but also to prevent generation of the friction noise. In addition, such binders used in the above-defined range of amount can impart an excellent film strength and good runnability to the magnetic recording medium.

The magnetic recording layer of the medium according to the invention further comprises a wear-resistant agent such as $Cr_2O_3$, $Al_2O_3$, $SiO_2$, $B_2O_3$ or a mixture thereof in the form of a powder. Preferably, $Cr_2O_3$, $Al_2O_3$ or a mixture thereof is used. The wear-resistant powder agent is generally used in an amount of about 2 to 20 wt %, preferably about 2 to 10 wt %, based on the magnetic metal powder. Less amounts are undesirable since the effect of preventing generation of the friction noise becomes smaller and the film strength can not be satisfactorily improved even though used in combination with the resin binder. In this sense, larger amounts are more preferable but an excessive amount of the agent results in a lowering of magnetic characteristic as typically shown in the sole figure of the accompanying drawing.

Then, a method of making the recording media will be described.

In practice, it is general to mix the starting components, i.e. the magnetic metal powder, wear-resistant powder agent, lubricant and organic resin binder, in amounts defined hereinbefore in an organic solvent to provide a magnetic dispersion. Though these starting components may be mixed one at a time, it is preferred that the magnetic metal powder, wear-resistant powder agent and organic resin binder are first mixed in organic solvent and then ethylene stearyl bisamide lubricant is added to the mixture. The reasons for this will be particularly illustrated in Examples which appear hereinafter. Briefly speaking, the magnetic recording layer obtained from a dispersion in which the lubricant is added after having mixed the three other components is more effective in preventing the friction noise or Q noise and formation of wear defects than that obtained from a dispersion in which the starting four components are mixed one at a time, even though the same level of the lubricant is used. This is advantageous in that an organic resin binder of smaller elasticity may be used, and that even through the lubricant is used in smaller amounts, the same effect can be attained as in the case where the four starting materials are mixed simultaneously.

The solvents useful in the present invention may be any of organic solvents ordinarily employed for the purpose.

In order to prepare the mixture, other ingredients such as dispersants, surface active agents and the like which are generally used for the purpose may be freely added.

The dispersion composition thus obtained is then coated on a support such as a polyester film in a desired thickness as well known in the art. The coating may be effected as usual, e.g. by a doctor coating method, a gravure coating method and the like.

The thus coated composition is then dried by suitable means at a temperature ranging 50° to 120° C. to form a continuous magnetic recording layer on the support.

As a matter of course, the magnetic composition may be coated on various types of supports such as resin films, resin plates or discs to make desired types of magnetic recording media.

The present invention will be particularly illustrated by way of examples and a comparative examples.

EXAMPLE 1

About 100 parts by weight of an acicular magnetic metal powder comprised of iron as its principal component or an acicular magnetic powder of an iron and cobalt alloy (having an axis ratio of about 7–11 and a mean length of about 0.3–0.4μ), about 20 parts by weight of a resin binder composed of a mixture of a vinyl alcohol-containing vinyl chloride-vinyl acetate copolymer (VAGH, product of U.C.C.) and a polyurethane elastomer (Nippolan 2304, product of Nippon Polyurethane Co., Ltd.) in mixing ratios indicated in Table appearing hereinlater, and ethylene stearyl bisamide ($C_{17}H_{35}CONH(CH_2)_2NHCOC_{17}H_{35}$, hereinafter abbreviated as ESBA) as a lubricant and $Al_2O_3$ and $Cr_2O_3$ as a wear-resistant agent both in amounts indicated in the table were mixed in 400 parts by weight of a mixed solvent of methyl ethyl ketone, toluene and methyl isobutyl ketone for the binder. The resulting dispersion was applied onto a polyester film as usual in a dry thickness of 4 microns. Then, the coated layer was dried at a temperature of 80° C. for 20 seconds to obtain a magnetic recording tape.

EXAMPLE 2

Example 1 was repeated except that about 20 parts by weight of a mixture of a vinyl alcohol-containing vinyl chloride-vinyl acetate copolymer (e.g. VAGH), a polyurethane elastomer (e.g. Nippolan 2304, product of Nippon Polyurethane Co., Ltd.) and a nitrile-butadiene rubber (e.g. Nipol 1432 J, product of Nippon Zeon Co., Ltd.) was used in order to make the elasticity of the binder greater than that ESBA and $Al_2O_3$ were used in amounts indicated in the table, thereby obtaining magnetic recording tapes.

EXAMPLE 3

Example 1 was repeated except that $Cr_2O_3$ was used as the wear-resistant agent in amounts indicated in the table and the amount of ESBA was held at a constant level indicated and that all the components other than ESBA were first mixed together and then ESBA were added to the mixture, thereby obtaining magnetic tapes. In this example, ESBA was added after mixing of the other components.

EXAMPLE 4

Example 3 was repeated using binder mixtures, wear-resistant agent and ESBA in amounts indicated in the table, thereby obtaining magnetic recording tapes.

COMPARATIVE EXAMPLE

Example 1 was repeated using $Al_2O_3$ as a wear-resistant agent and various types of lubricant such as silicone oil, triolein, squalene, a perfluoroalkyl ether (e.g. Krytox 143AZ, product of Du Pont de Nemours), stearic acid amide having a chemical structure similar to ESBA and mixtures thereof in amounts indicated in the table, thereby obtaining various magnetic recording tapes.

The magnetic recording tapes made in Examples 1 through 4 and Comparative Examples were each set in a magnetic recording and reproducing apparatus to check whether the friction noise or Q noise was generated or not and a degree of wear defect produced on the magnetic tape. The generation of Q noise was determined as follows:

The back tension of a travelling tape was changed continuously from 0 to 120 g; and the Q noise was determined as generated when a noise of 3-4 KHz was generated on reproduction of a recording signal of 20 KHz or when a noise was caught by a head phone on listening of a reproduced sound in a recording and monitoring state of the magnetic recorder and reproducing apparatus. The degree of wear defects on the magnetic tape was determined by visual observation after the tape had been passed once through the apparatus in a condition of back tension of 50 g or 120 g.

The test results are shown in Table below. In the Table, values of the respective binding components represent proportions of such components when a total sum of the proportions is 100, and the amounts of the wear-resistant agent and the lubricant are % by weight based on the magnetic metal powder. In addition, the degrees of generation of Q noise and of wear defects are evaluated in four ranks, as excellent, good, fair and bad.

from the above results, the generation of Q noise is effectively prevented when ESBA is added in an amount of about 1 to 10 wt % of the magnetic metal powder. The use of ESBA in an amount of about 1 to 5% based on the magnetic metal powder was found preferable not only from a viewpoint that the Q noise is satisfactorily prevented, but also from a viewpoint that it is prevented from being bloomed at least to a visually observed extent.

What is claimed is:

1. A magnetic recording medium comprising a suport and a magnetic recording layer formed on said support and comprised of a magnetic powder of a metal or alloy, about 2.0 to 20 wt % of an abrasion-resistant metal oxide, about 1.0 to 10 wt % of ethylene stearyl bisamide and about 10 to 25 wt % of an organic resin binder, all based on said magnetic metal powder.

2. A magnetic recording medium according to claim

TABLE

| | Kind and Proporton (%) of organic resin | | | Kind and amount (% by weight based on magnetic metal powder) of wear-resistant agent | | Kind and amount (% based on magnetic metal powder) of lubricants | Effect of preventing friction noise or Q noise | Effect of preventing wear defects |
|---|---|---|---|---|---|---|---|---|
| | VAGH | Nippolan 2304 | Nipol 1432J | $Al_2O_3$ | $Cr_2O_3$ | | | |
| Example 1 | 75 | 25 | 0 | 0 | 2 | ESBA 1.5 | Fair | Fair |
| | 75 | 25 | 0 | 10 | 0 | ESBA 2.0 | Good | Fair |
| | 60 | 20 | 20 | 10 | 0 | ESBA 2.0 | Good | Good |
| Example 2 | 60 | 20 | 20 | 10 | 0 | ESBA 3.0 | Excellent | Good |
| | 40 | 30 | 30 | 10 | 0 | ESBA 2.0 | Excellent | Excellent |
| Example 3 | 75 | 25 | 0 | 0 | 2 | ESBA 2.0 | Excellent | Good |
| | 75 | 25 | 0 | 0 | 5 | ESBA 2.0 | Excellent | Excellent |
| | 75 | 22 | 3 | 0 | 5 | ESBA 2.0 | Good | Excellent |
| | 60 | 20 | 20 | 10 | 10 | ESBA 1.0 | Good | Excellent |
| Example 4 | 60 | 20 | 20 | 10 | 10 | ESBA 2.0 | Excellent | Excellent |
| | 60 | 20 | 20 | 10 | 10 | ESBA 3.0 | Excellent | Excellent |
| | 65 | 30 | 5 | 0 | 5 | ESBA 2.0 | Excellent | Excellent |
| | 75 | 22 | 3 | 7 | 8 | ESBA 2.0 | Excellent | Excellent |
| | 75 | 25 | 0 | 10 | 0 | silicone oil 3.0 | Bad | Bad |
| | 75 | 25 | 0 | 10 | 0 | triolein and squalane 3.0 | Bad | Bad |
| | 75 | 25 | 0 | 10 | 0 | triolein, squalane, light wax 30 | Bad | Bad |
| Comparative Example | 75 | 25 | 0 | 10 | 0 | stearic acid amide 3.0 | Bad | Bad |
| | 75 | 25 | 0 | 10 | 0 | triolein, squalane 1.5 | Bad | Bad |
| | 75 | 25 | 0 | 10 | 0 | triolein, squalane 4.5 | Bad | Bad |
| | 60 | 20 | 20 | 10 | 0 | triolein, squalane 2.2 | Bad | Bad |
| | 40 | 30 | 30 | 10 | 0 | triolein, squalane 2.2 | Bad | Bad |

From the above results, it has been found that known lubricants which were believed effective on application to known magnetic metal oxide powder, e.g. monohydric alcohol esters of fatty acids such as stearic acid, fatty acid amides such as stearic acid amide, silicone oil, and the hydrocarbon oils, are not suitable as a lubricant of magnetic recording media using magnetic metal powders. To a surprise, ESBA which has been considered ineffective as a lubricant of magnetic recording media using magnetic metal powders has been found very preferable for such purpose. As will be understood 1, wherein said ethylene stearyl bisamide is contained in an amount of about 1 to 5 wt % of said metal powder.

3. A magnetic recording medium according to claim 2, wherein said wear-resistant metal oxide is $Al_2O_3$, $Cr_2O_3$ or a mixture thereof.

4. A magnetic recording medium according to claim 1, wherein said magnetic metal powder is an acicular magnetic powder of iron or iron-cobalt alloys having a mean length of 0.3 to 0.6$\mu$.

* * * * *